US012517698B2

(12) United States Patent
Thunuguntla et al.

(10) Patent No.: US 12,517,698 B2
(45) Date of Patent: Jan. 6, 2026

(54) MAINTAINING STREAMING PARITY IN LARGE-SCALE PIPELINES

(71) Applicant: INTUIT INC., Mountain View, CA (US)

(72) Inventors: Saikiran Sri Thunuguntla, Bangalore (IN); Kaushik S, Bangalore (IN); Sudarma Denson Pokta, San Diego, CA (US); Amit Kumar Soni, Mountain View, CA (US); Aman Agrawal, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 134 days.

(21) Appl. No.: 18/326,893

(22) Filed: May 31, 2023

(65) Prior Publication Data

US 2024/0402990 A1    Dec. 5, 2024

(51) Int. Cl.
*G06F 7/02*     (2006.01)
*G06F 9/48*     (2006.01)
*G06F 11/14*    (2006.01)
*G06F 16/28*    (2019.01)

(52) U.S. Cl.
CPC .............. *G06F 7/02* (2013.01); *G06F 9/4881* (2013.01); *G06F 11/14* (2013.01); *G06F 16/285* (2019.01)

(58) Field of Classification Search
CPC .. G06F 9/4881; G06F 9/3867; G06F 11/1076; G06F 3/0619; G06F 11/10; G06F 3/0614; G06F 16/285; G06F 11/14; G06F 11/16; G06F 11/1629; H04L 1/0057; H04L 1/0061
See application file for complete search history.

(56) References Cited

U.S. PATENT DOCUMENTS

| | | | | |
|---|---|---|---|---|
| 7,366,829 | B1* | 4/2008 | Luttrell | G06F 11/1064 711/108 |
| 9,256,657 | B1* | 2/2016 | Evenson | G06F 16/258 |
| 9,965,793 | B1* | 5/2018 | Hasan | G06F 16/24561 |
| 10,496,817 | B1* | 12/2019 | Furbish | G06F 16/285 |
| 11,675,816 | B1* | 6/2023 | Chandrasekharan | G06F 16/24568 707/737 |
| 2009/0313299 | A1* | 12/2009 | Bonev | G06F 16/285 707/999.103 |
| 2015/0012478 | A1* | 1/2015 | Mohammad | G06F 16/254 707/602 |

(Continued)

*Primary Examiner* — Pierre Vital
*Assistant Examiner* — Jedidiah P Ferrer
(74) *Attorney, Agent, or Firm* — DLA PIPER LLP US

(57) ABSTRACT

In a pipeline, data events generated by a producer application are temporally grouped by using a group identification tag. For each data event, data points are generated and uploaded to a storage and cache at each point of production and consumption. The storage allows a matching of data events between the production point and the consumption point, thereby ensuring that streaming parity is maintained. In cases of mismatch, the cache allows for detecting missing data events, i.e., identifying data events that were generated by an upstream producer application, but not consumed by a downstream consumer. While being agnostic to the transformations applied by the various applications in the pipeline, the embodiments disclosed herein keep track of the output data events and input data events and precisely identify the missing data events.

10 Claims, 5 Drawing Sheets

(56) References Cited

U.S. PATENT DOCUMENTS

| | | | |
|---|---|---|---|
| 2016/0350358 A1* | 12/2016 | Patel | G06F 16/1748 |
| 2017/0083396 A1* | 3/2017 | Bishop | G06F 11/14 |
| 2018/0129699 A1* | 5/2018 | Gould | G06F 16/288 |
| 2019/0104163 A1* | 4/2019 | Garrido | H04L 65/1089 |
| 2019/0130004 A1* | 5/2019 | Singh | G06F 16/283 |
| 2020/0120008 A1* | 4/2020 | Deb | H04L 43/062 |
| 2021/0216536 A1* | 7/2021 | Rogers | G06F 16/958 |

* cited by examiner

MAINTAINING STREAMING PARITY IN LARGE-SCALE PIPELINES

BACKGROUND

The computing infrastructures of large organizations have large-scale, complex data pipelines to handle multiple applications that produce and consume data events. A data event is generally a data packet that is generated to communicate information between different hops of the pipelines. For example, a data event may comprise clickstream data, transaction data, and/or any other type of data. Within a pipeline, multiple data events flow through multiple hops (applications producing or consuming data events) with or without transformations. These data events are generally streamed—produced and consumed on the fly—as opposed to aggregated batch processing. To ensure the integrity of the pipelines, the loss of data events in the pipelines have to detected and tracked. In other words, streaming parity of the data events across the different hops of the pipelines has to be maintained. When the streaming parity is maintained, the results of the pipelines can be trusted.

Maintaining streaming parity in complex pipelines, however, presents a whole host of technical challenges. First, unlike batch processing, streaming is continuous and relentless: there are no bounds for when a particular stream will start, stop/pause, and resume. That is, unlike a fixed data table whose size is known a priori, streaming is a continuous train of data events that has be handled without knowing when the train will stop. In other words, the data events are always in motion. Second, different hops may produce and/or consume data events at different rates. For instance, if an upstream hop generates data events at a higher speed compared to a downstream hop that consumes the data events at a lesser speed, it is challenging to keep track of the excess data events that accumulate between the upstream hop and the downstream hop. Third, the different hops may not necessarily have a 1:1 relationship between input data events and output data events—some hops may consume more data events to generate less data events (many:1 relationship) while other hops may consume less data events to generate more data events (1:many relationship). Lack of such 1:1 relationship mapping generates another layer of complexity for managing parity across a complex pipeline. Fourth, a single data event may be generated and/or consumed multiple times, e.g., as a part of an in-built redundancy to account for data packet loss or other errors in the pipeline. The presence of the duplicate data events adds more challenges for tracking the data event across a complex pipeline. In view of these technical challenges, existing tools have been less than satisfactory in maintaining streaming parity of data events in complex pipelines.

Therefore, a significant improvement in systems, methods, and processes of maintain streaming parity in complex pipelines is desired.

SUMMARY

Embodiments disclosed herein solve the aforementioned technical problems and may provide other solutions as well. One or more embodiments first temporally group data events as they are produced. The temporal grouping, which is done by adding a group identification tag to the headers of the data events, allows time-bound tracking of the data events across different applications in a pipeline. For each data event produced by a first application, a first composite key containing at least the identification tag of the application, group identification tag, and event identification tag is uploaded into a database. Additionally, a second composite key comprising the identification tag of the application and the group identification tag in association with the event identification tag (serving as a key identifier) is uploaded to a cache. Similar uploads are done for a second application that consumes the data events. Duplicates are removed and matching operations are performed between the data points of the producer application and the consumer application. In the database, if the non-duplicate first composite keys match, no data events have been lost and if there are mismatches, data events have been lost. In the cache, if the key identifiers match for each second composite key between the producer application and the consumer application, no data events have been lost. If there is a mismatch, the unmatched key identifiers in the cache will precisely identify which data events are missing. Streaming parity is therefore maintained by confirming the matches between production and consumption between every producer-consumer pair. For non-matches, the missing data events are identified for remedial operations to maintain the streaming parity.

In one or more embodiments, a computer-implemented method for maintaining streaming parity of data events in a pipeline is provided. The method may include temporally grouping data events generated by a first application in the pipeline by adding a group identification tag to data events generated within a predetermined time window and uploading a first set of data points identifying temporally grouped data events to a storage. The method may also include retrieving temporally grouped data events received by a second application from the first application and uploading to the storage a second set of data points identifying temporally grouped data events received by the second application from the first application. The method may further include aggregating the first set of data points based on a first identification tag of the first application and the group identification tag, aggregating the second set of data points based on a second identification tag of the second application and the group identification tag, and determining that the streaming parity of the temporally grouped data events is maintained by determining that the aggregated first set of data points matches the aggregated second set of data points.

In one or more embodiments, a system is provided. The system may include a non-transitory storage medium storing computer program instructions and a processor configured to store the computer program instructions to cause operations. The operations may include temporally grouping data events generated by a first application in a pipeline by adding a group identification tag to data events generated within a predetermined time window and uploading to a first set of data points identifying temporally grouped data events to a storage. The operations may also include retrieving temporally grouped data events received by a second application from the first application and uploading to the storage a second set of data points identifying temporally grouped data events received by the second application from the first application. The operations may further include aggregating the first set of data points based on a first identification tag of the first application and the group identification tag, aggregating the second set of data points based on a second identification tag of the second application and the group identification tag, and determining that a streaming parity of the temporally grouped data events is maintained based on determining that the aggregated first set of data points matches the aggregated second set of data points.

DETAILED DESCRIPTION OF SEVERAL EMBODIMENTS

In a pipeline, data events generated by a producer application are temporally grouped by using a group identification tag. For each data event, data points are generated and uploaded to a storage and cache at each point of production and consumption. The storage allows a matching of data events between the production point and the consumption point, thereby ensuring that the streaming parity is maintained. When there is a mismatch, the cache allows detecting missing data events, i.e., identifying data events that were generated by an upstream producer application but not consumed by a downstream consumer. While being agnostic to the transformations applied by the various applications in the pipeline, the embodiments disclosed herein keep track of the output data events and input data events and precisely identify the missing data events.

Figure 1:
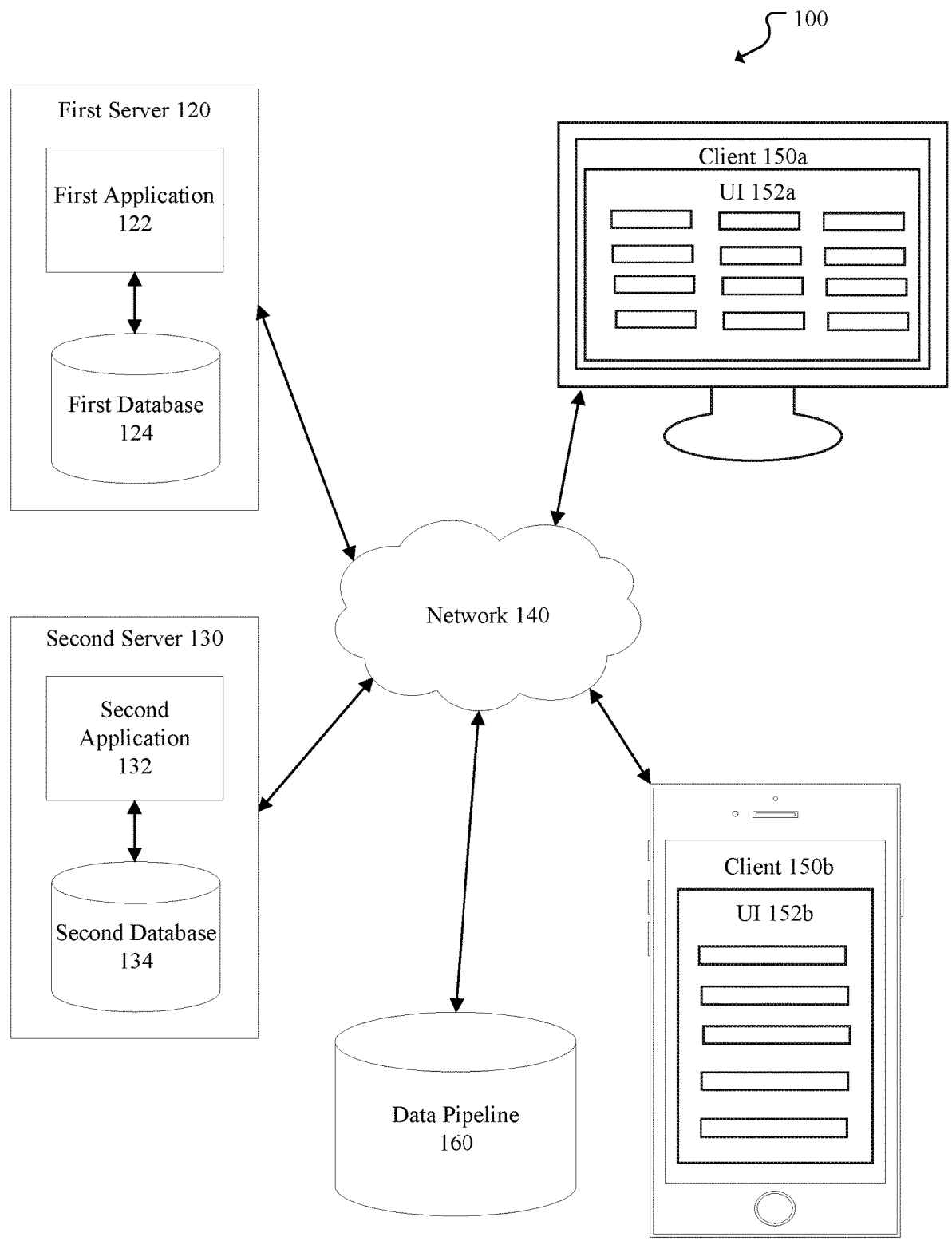
FIG. 1 shows an example of a system configured for maintaining streaming parity of data events in a pipeline, based on the principles disclosed herein.

FIG. 1 shows an example of a system 100 configured for maintaining streaming parity of data events in a pipeline, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150"), servers 120, 130, and a data pipeline 160 interconnected by a network 140. The first server 120 hosts a first server application 122 and a first database 124 and the second server 130 hosts a second server application 132 and a second database 134. The client devices 150a, 150b have user interfaces 152a, 152b, respectively, (collectively referred to herein as "user interfaces (UIs) 152"), which may be used to communicate with the server applications 122, 132 and the data pipeline 160 using the network 140.

The data pipeline 160 may be implemented by a database maintained by a cloud service provider. For example, the data pipeline 160 may be implemented as AWS S3 storage storing a plurality of data. The server applications 122, 132 access the data pipeline 160 to perform the operations disclosed herein to maintain the streaming parity in the data pipeline. Results of the operations can be stored in the corresponding databases 124, 134.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., admin user inputs. The UIs 152 are generally graphical user interfaces (GUIs). For example, an admin user may use the UIs to provide configuration parameters, provide commands to implement the embodiments disclosed herein. Additionally, the UIs 152 can show metrics dashboards generated by the server applications 122, 132 as discussed below in more detail.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and or second server 130. A single user may have multiple client devices 150, and or there may be multiple users each having their own client devices 150.

Furthermore, it should be understood that the server applications 122, 132 running on the servers 120, 130, and the databases 124, 134 being hosted by the servers 120, 130 are just examples for understanding the disclosed principles, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
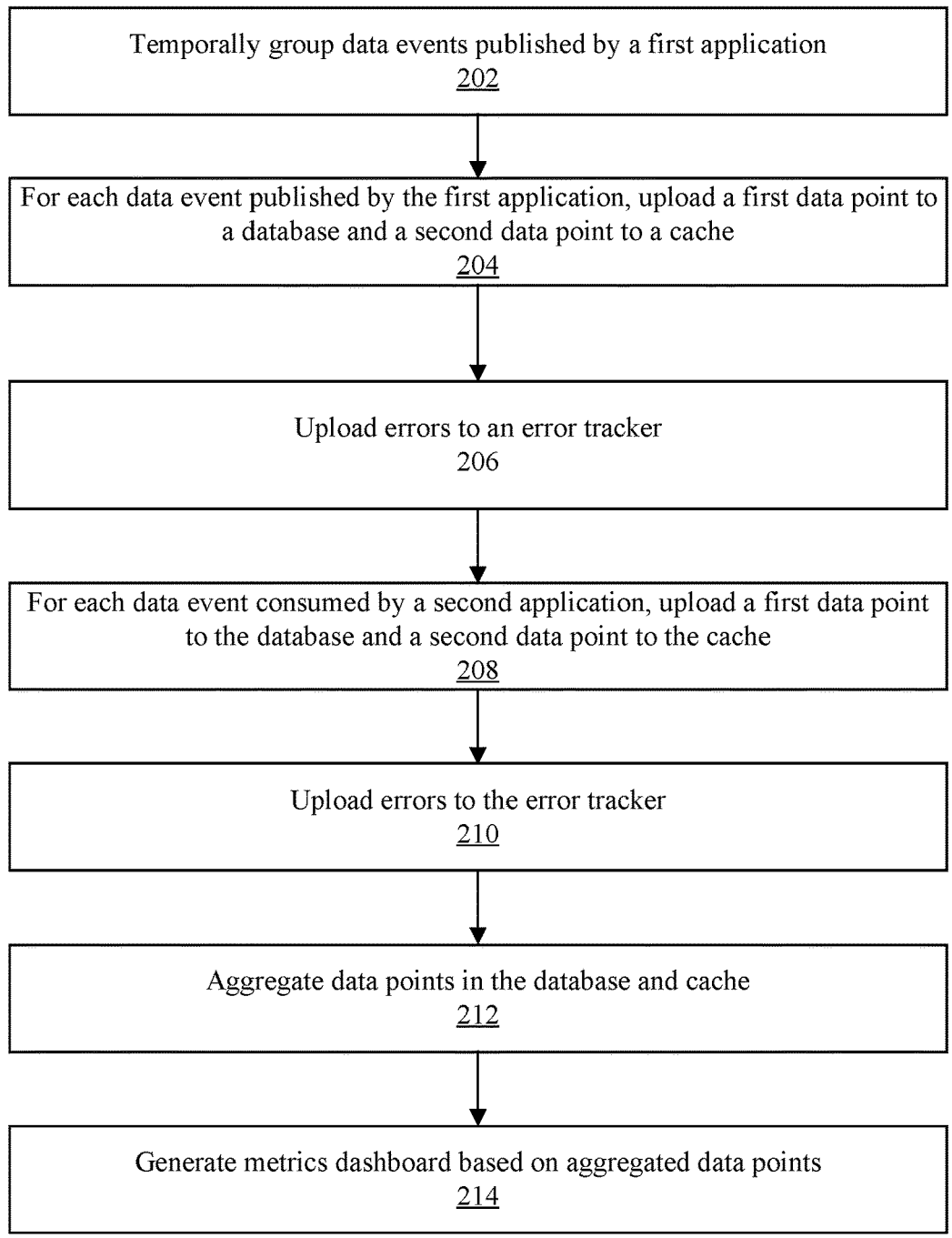
FIG. 2 shows an example method for maintaining streaming parity of data events in a pipeline, based on the principles disclosed herein.

FIG. 2 shows an example method 200 for maintaining streaming parity of data events in a pipeline, based on the principles disclosed herein. It should be understood that the steps of the method 200 are provided as examples and should not be considered limiting. Therefore, methods with alternative, additional, or fewer number of steps should be considered within the scope of this disclosure. The steps of the method 200 may be performed by any combination of components of the system 100 shown in FIG. 1. The steps of the method 200 are described in association with FIGS. 3 and 4 where FIG. 3 shows a partial view 300 of a pipeline based on the principles disclosed herein and FIG. 4 shows data events produced by a first application and consumed by a second application in the pipeline shown in FIG. 3 based on the principles disclosed herein.

The method 200 begins at step 202, where data events published by a first application may be temporally grouped. For instance, the grouping may be based on a time window (e.g., every hour, every minute, etc.) and data events falling within the same time window are assigned the same group identification tag in the corresponding headers. The grouping is performed when the data events are published to a message broker (e.g., Kafka®).

Figure 3:
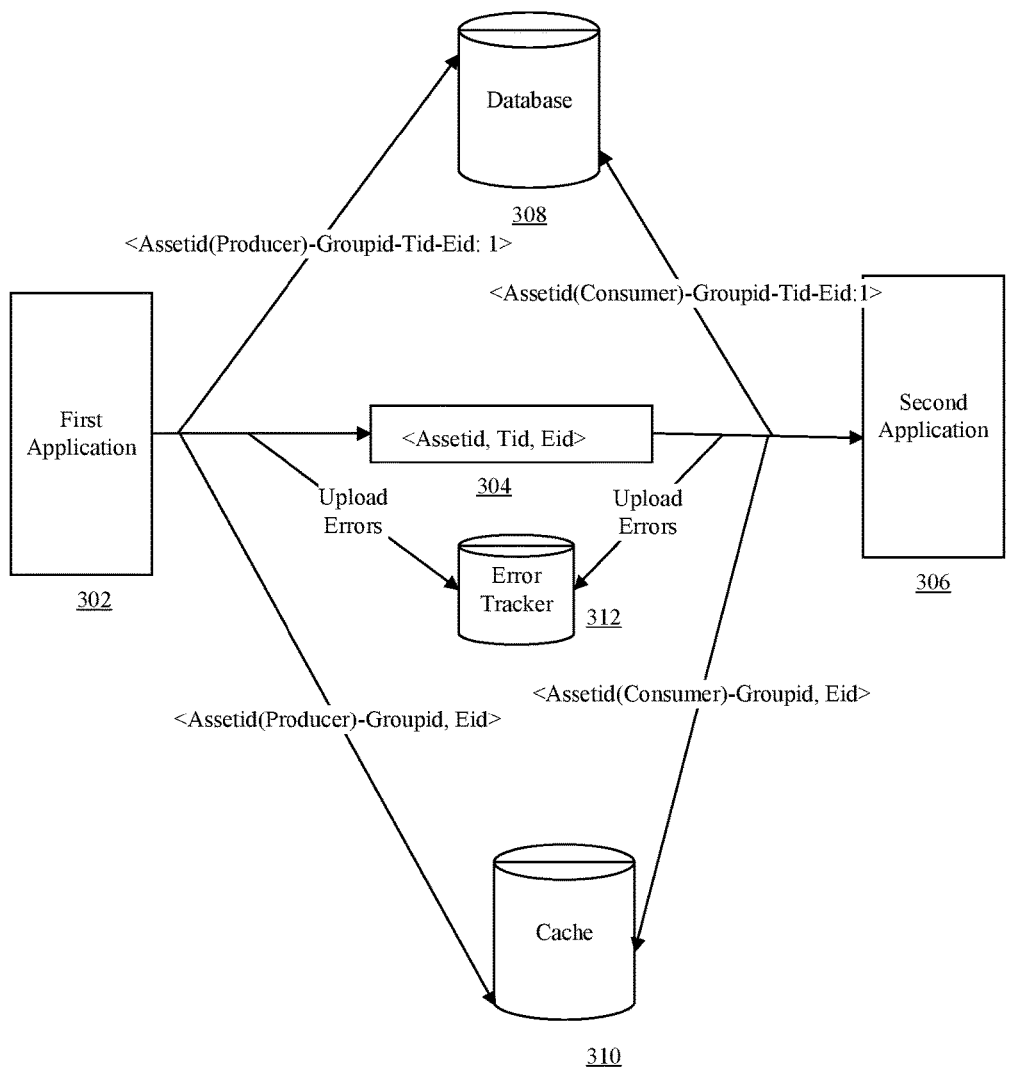
FIG. 3 shows a partial view of a pipeline, based on the principles disclosed herein.
Figure 4:
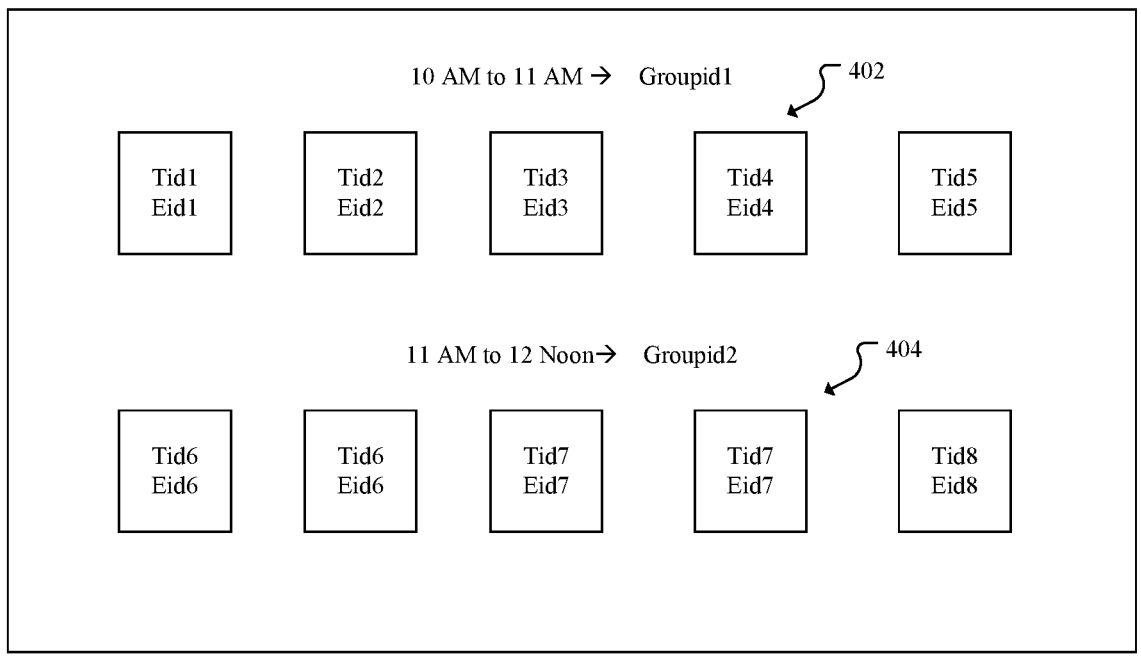
FIG. 4 shows data events produced by a first application and consumed by a second application in the pipeline shown in FIG. 3, based on the principles disclosed herein.

For example, the partial view 300 of the pipeline shown in FIG. 3 shows a first application 302 publishing data events to a data broker 304. The first application 302 therefore becomes a producer application in this example. Headers for the data events published by the application 302 may already have multiple tags in the corresponding headers (e.g., headers of data packets carrying the payload of the data events). For example, the data events may already have an asset identification tag (Assetid), which is a unique identification for the application 302; transaction identification tag (Tid), which is a unique identification for a transaction that generated the data events; event identification tag (Eid), which is a unique identification assigned to each data event; event type tag (EventType), which identifies a domain event type (e.g., name of the company) associated with the data events; etc. The existing tags in the data events generated by the first application 302 can therefore be listed as follows:

<Assetid, Tid, Eid, EventType>

To implement the temporal grouping, an additional group identification tag (Groupid) may be added to the data events. The Groupid may be unique to a predetermined time window. For example, data events published by the first application 302 between 10 AM-11 AM may be assigned Groupid1, while data events published by the first application 302 between 11 AM-12 Noon may be assigned Groupid2. The unboundedness of the data is therefore handled—or bounded—using the temporal grouping implemented through the additional Groupid tag. One or more of the existing tags may be used, as described below, for identifying duplicate data events within the same time window, i.e., data events having the same Groupid tag. Embodiments disclosed herein may use the following tags (e.g., a subset of existing tags and the Groupid tag) for the various operations:

<Assetid, Groupid, Tid, Eid>

At step 204, for each data event published by the first application 302, two data points may be uploaded to one or more databases (e.g., databases separate from the message broker 304). The data points may be lightly weighted, thereby causing relatively small storage/memory overhead during the implementation of the embodiments disclosed herein. A first data point of the two data points may include:

<Assetid-Groupid-Tid1-Eid1, 1>

As shown in FIG. 3, the first data point may be uploaded to a first database 308, which may include an elastic search database (e.g., non-sql search database). A second data point of the two data points may include:

<Assetid-Groupid, Eid>

As further shown in FIG. 3, the second point may be uploaded to a cache 310, e.g., a key-value cache such as Redis®.

Because the Eid tag is unique for each data event, the Eid can be used as a key identifier (key id). Combinations of other tags (with or without Eid) may be referred to as composite keys. Therefore, the first data point may also be referred to as:

<composite-key1, 1>

And the second data point may also be referred to as:

<composite-key2, key id>

FIG. 4 shows data events produced by the first application 302 as an illustrated example of data events. Particularly, five data events 402 are generated between 10 AM-11 AM, the subset of tags for the data events 402 being <Tid1, Eid1>, <Tid2, Eid2>, <Tid3, Eid3>, <Tid4, Eid4>, and <Tid5, Eid5>. Since these data events 402 belong to the same time window, they are assigned the same tag of Groupid1. Because the first application 302 is the producer, the Assetid assigned to the data events 402 is P1 (indicating Producer 1). Additionally, five data events 404 are generated between 11 AM-12 Noon, the subset of tags for the data events 404 being <Tid6, Eid6>, <Tid6, Eid6>, <Tid7, Eid7>, <Tid7, Eid7>, and <Tid8, Eid8>. Because these data events 404 belong to the same time window, they are assigned the same tag of Groupid2, which is different from the tag Groupid1 assigned to data events 402.

The data points corresponding to the data events 402, 404 and that are uploaded to the database 308 therefore include:

<P1-Groupid1-Tid1-Eid1:1>
<P1-Groupid1-Tid2-Eid2:1>
<P1-Groupid1-Tid3-Eid3:1>
<P1-Groupid1-Tid4-Eid4:1>
<P1-Groupid1-Tid5-Eid5:1>
<P1-Groupid2-Tid6-Eid6:1>
<P1-Groupid2-Tid6-Eid6:1>
<P1-Groupid2-Tid7-Eid7:1>
<P1-Groupid2-Tid7-Eid7:1>
<P1-Groupid2-Tid8-Eid8:1>

Additionally, the data points corresponding to data events 402, 404 and that are uploaded to the cache 310 include:

<P1-Groupid1, Eid1>
<P1-Groupid1, Eid2>
<P1-Groupid1, Eid3>
<P1-Groupid1, Eid4>
<P1-Groupid1, Eid5>
<P1-Groupid2, Eid6>
<P1-Groupid2, Eid6>
<P1-Groupid2, Eid7>
<P1-Groupid2, Eid7>
<P1-Groupid2, Eid8>

It should, however, be noted that any unique identifier to the data events 402,404 can be used as the key identifier in the cache 310. For example, if each of the data events 402, 404 has a unique Tid, it can be used in lieu of the Eid.

At step 206, errors for the first data point and/or the second data point are uploaded to an error tracker. For example, there may be errors when uploading the data points to the database 308 and/or the cache 310. For example, FIG. 3 shows an error tracker 312, which may include any type of log store with analytics (e.g., a Splunk tool) that may aggregate all error logs from the different applications (e.g., 302, 306). The error tracker 312 may be used to augment the results generated from the database 308 and the cache 310.

At step 208, for each data event consumed by the second application 306, a first data point may be uploaded to the database 308 and a second data point may be uploaded to a cache 310. Continuing with the above example of data events 402, 404, these data events may be consumed by the second application 306. That is, the second application 306 reads the data events 402, 404 from the message broker 304. When the data events 402, 404 are read, their Assetid may change to C1 (Consumer 1), but the Groupid, Tid, and Eid tags may remain the same.

The data points uploaded to the database 308 by the second application 306 (i.e., consumer) may include:

<C1-Groupid1-Tid1-Eid1:1>
<C1-Groupid1-Tid2-Eid2:1>
<C1-Groupid1-Tid3-Eid3:1>
<C1-Groupid1-Tid4-Eid4:1>
<C1-Groupid1-Tid5-Eid5:1>
<C1-Groupid2-Tid6-Eid6:1>
<C1-Groupid2-Tid6-Eid6:1>

<C1-Groupid2-Tid7-Eid7:1>
<C1-Groupid2-Tid7-Eid7:1>
<C1-Groupid2-Tid8-Eid8:1>

Furthermore, the data points uploaded to the cache 310 by the second application 306 may include:
<C1-Groupid1, Eid1>
<C1-Groupid1, Eid2>
<C1-Groupid1, Eid3>
<C1-Groupid1, Eid4>
<C1-Groupid1, Eid5>
<C1-Groupid2, Eid6>
<C1-Groupid2, Eid6>
<C1-Groupid2, Eid7>
<C1-Groupid2, Eid7>
<C1-Groupid2, Eid8>

At step 210, errors for the data points are uploaded to an error tracker. For example, there may be errors when uploading the data points to the database 308 and/or the cache 310. As described above, the error tracker 312 may include any type of log store with analytics (e.g., a Splunk tool) that may aggregate all error logs from the different applications (e.g., 302, 306). The error tracker 312 may be used to augment the results generated from the database 308 and the cache 310 (e.g., to resolve dual-write problems).

At step 212, the data points in the database 308 and the cache 310 are aggregated. The aggregation generally includes removal of duplicates and consolidation of the data events based on Assetid-Groupid. In the database 308 for example, the data points on the producer side (i.e., application 302) can be consolidated as follows
<P1-Groupid1-Tid1-Eid1:1>
<P1-Groupid1-Tid2-Eid2:1>
<P1-Groupid1-Tid3-Eid3:1>
<P1-Groupid1-Tid4-Eid4:1>
<P1-Groupid1-Tid5-Eid5:1>
<P1-Groupid2-Tid6-Eid6:1>
<P1-Groupid2-Tid7-Eid7:1>
<P1-Groupid2-Tid8-Eid8:1>

The aggregation consolidates duplicate data events. In the data points described in para. 29 above, <P1-Groupid2-Tid6-Eid6:1> and <P1-Groupid2-Tid7-Eid7:1> are duplicates that are generated when a data event is generated multiple times. The data events are generated multiple times to account for packet loss, and/or any other error in the pipeline. Similarly, the aggregation in the cache 310 organizes the data events according to the Assetid-Groupid combination. For example, the Eids may become keys to each entry for the Assetid-Groupid combination. Continuing with the above example, the aggregation on the cache 310 of the producer side data points results in:
P1-Groupid1: <Eid1, Eid2, Eid3, Eid4, Eid5>
P1-Groupid2: <Eid6, Eid7, Eid8>

The aggregation of consumer side data points also removes the duplicates. Continuing with the above example, the aggregation of data points may generate the following consumer side data points by removing the duplicates for <C1-Groupid2-Tid6-Eid6:1> and <C1-Groupid2-Tid7-Eid7:1>.
<C1-Groupid1-Tid1-Eid1:1>
<C1-Groupid1-Tid2-Eid2:1>
<C1-Groupid1-Tid3-Eid3:1>
<C1-Groupid1-Tid4-Eid4:1>
<C1-Groupid1-Tid5-Eid5:1>
<C1-Groupid2-Tid6-Eid6:1>
<C1-Groupid2-Tid7-Eid7:1>
<C1-Groupid2-Tid8-Eid8:1>

Furthermore, the data points in the cache 310, for the consumer side, are aggregated as:
C1-Groupid1: <Eid1, Eid2, Eid3, Eid4, Eid5>
C1-Groupid2: <Eid6, Eid7, Eid8>

At step 214, a metrics dashboard is generated based on the aggregated data points in the database 308 and the cache 310, and augmented by error logs in the error tracker 312. The metrics dashboard shows the production and consumption of the data events by different applications across the pipeline. In the example, the metrics dashboard may show that, on the production side, the data events generated were:
P1-Groupid1: 5
P1-Groupid2: 3

On the consumption side, the date events consumed were:
C1-Groupid1: 5
C1: Groupid2: 3

Therefore, the consumption matches the production and so the parity of the streaming data events is maintained.

The cache 310 is used to track which keys (i.e., Eids or Tids) were produced and consumed. This tracking helps maintain parity of production and consumption of the keys, and if the parity is broken, which are the missing keys. Tracking of keys can be performed by any of the following processes.

In one or more embodiments, both the first application 302 (on the production side) and the second application 306 (on the consumption side) upload the keys (e.g., grouped by Assetid-Groupid) to the cache. Periodic comparisons between the uploaded keys may be made to determine if any of keys are missing on the consumption side. That is, the missing keys can be found by keys in a first set of P1-Groupid1 and in a second set of C1-Groupid1. If the difference is 0, no keys (i.e., no data events) were lost. If the difference is not 0, the keys in the first set (but not in the second set) were not consumed by the second application 306, thereby breaking the parity with respect to the corresponding data events. As the non-consumed keys have been identified with precision, remedial actions may be taken to recover the corresponding data events.

In one or more embodiments, the first application 302 uploads the keys to the cache as they are produced and the second application 306 deletes the keys in the cache as they are consumed. If all the keys for a particular Assetid-Groupid are consumed and deleted, parity is not broken. If there are some keys remaining, then the parity is broken. As the remaining keys can be identified with precision, remedial actions may be taken to recover the corresponding data events.

In one or more embodiments, there may be time bounds for the missing data events. For example, different data events may arrive at different times at the second application 306 based on the different packet-switching routes taken by the data events. A configurable time window may be provided before a data event is labeled as missing. For example, based on the nature of the pipeline and/or the speed of the network, a data event may be labeled as missing if cannot be accounted for after 5 minutes of its production, an hour of its production, etc.

Embodiments disclosed herein further address the mismatch between the speed of production and the speed of consumption. As the data events are grouped by time, the tracking across the applications (i.e., by using the database 308 and the cache 310) is performed for each temporal group. In other words, the embodiments determine whether all member data events of a temporal group can be accounted for at the consumption side—agnostic to how fast/slow the data events are consumed. That is, creating a temporal group which does not depend on the speed of production (i.e., the temporal group just depends upon the time window of production) and consumption may solve the speed mismatch between the production and consumption.

Furthermore, parity is inbuilt into the producer and consumer applications. In other words, parity marker events are tapped directly from the producer applications and the consumer applications. Parity marker events may be metadata associated with data events. For example, Groupid, Tid, etc. from a data event can be used to compose a parity marker event without using the entirety of the data event. Embodiments disclosed herein can therefore handle pipelines with different data sinks, because these data sinks may not necessarily have to be accessed. The parity marker events are generally captured upstream of these data sinks.

Embodiments disclosed herein further address the disparity between input data events and output data events caused by transformations applied by some applications. For example, some applications may consume more data events to generate less data events. Other applications may consume less data events to generate more data events. Because the matching is performed between each producer-consumer pair, i.e., to determine that each data event that was produced in an upstream producer application was consumed by a downstream consumer application, the embodiments may be agnostic to the transformations. For example, if a consumer application has accounted for all the input data events, it can inherently be assumed that the consumer application has used all the input data in its transformation, regardless of the number of output event it produces. Because the analysis is in the form of {Producer-Consumer} set, and as long as the number of data events at the producer side matches the number of the data events matches at a downstream consumer side, no data events have been lost.

Furthermore, by using three different storages 308, 310, 312, embodiments disclosed herein are not susceptible to bugs in the message broker 304. Should the matching be performed using the message broker 304 itself, inadvertent errors could creep in due to bugs. As the matching is performed outside the pipeline, with different storages each using its own process, these errors due to bugs in the message broker 304 and/or the pipeline in general can be minimized. Additionally, the use of the three different storages 308, 310, 312 may solve the dual write problem (e.g., Splunk with error logs is used along with Elasticsearch/Redis)

Figure 5:
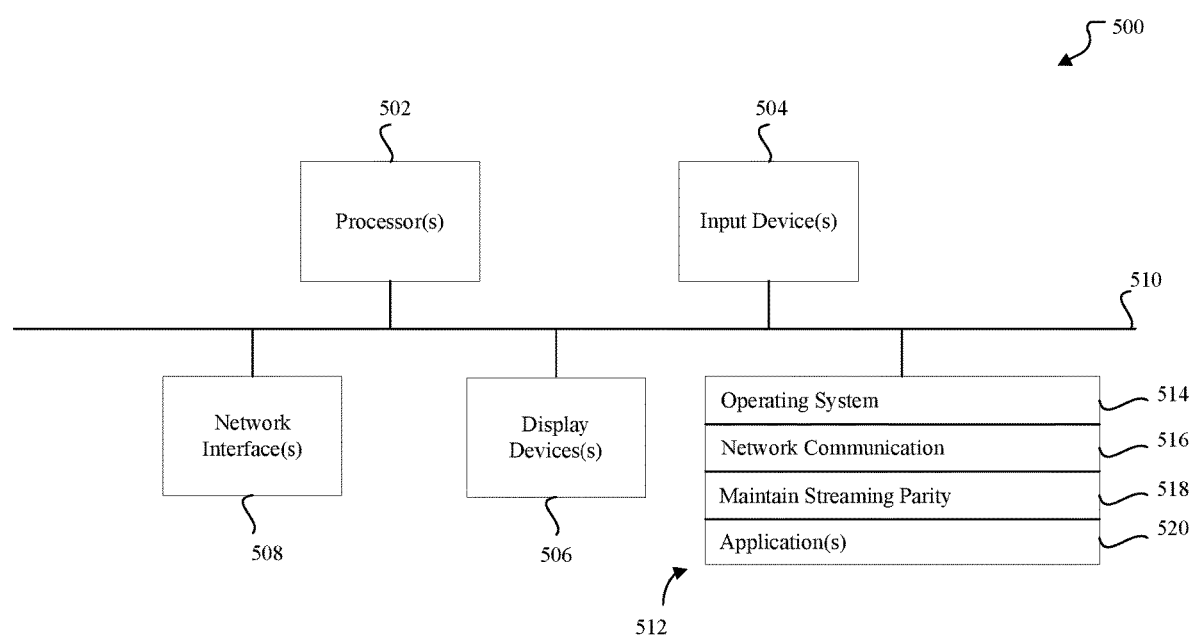
FIG. 5 shows a block diagram of an example computing device that implements various features and processes, based on the principles disclosed herein.

FIG. 5 shows a block diagram of an example computing device 500 that implements various features and processes based on the principles disclosed herein. For example, computing device 500 may function as first server 120, second server 130, client 150a, client 150b, data lake 160 or a portion or combination thereof in some embodiments. The computing device 500 also performs one or more steps of the method 200. The computing device 500 is implemented on any electronic device that runs software applications derived from compiled instructions, including without limitation personal computers, servers, smart phones, media players, electronic tablets, game consoles, email devices, etc. In some implementations, the computing device 500 includes one or more processors 502, one or more input devices 504, one or more display devices 506, one or more network interfaces 508, and one or more computer-readable media 512. Each of these components is be coupled by a bus 510.

Display device 506 includes any display technology, including but not limited to display devices using Liquid Crystal Display (LCD) or Light Emitting Diode (LED) technology. Processor(s) 502 uses any processor technology, including but not limited to graphics processors and multi-core processors. Input device 504 includes any known input device technology, including but not limited to a keyboard (including a virtual keyboard), mouse, track ball, and touch-sensitive pad or display. Bus 510 includes any internal or external bus technology, including but not limited to ISA, EISA, PCI, PCI Express, USB, Serial ATA or FireWire. Computer-readable medium 512 includes any non-transitory computer readable medium that provides instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 includes various instructions 514 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 establish and maintain network connections (e.g., software for implementing communication protocols, such as TCP/IP, HTTP, Ethernet, telephony, etc.).

Maintain streaming parity 518 includes instructions that implement the disclosed embodiments for maintaining streaming parity of data events across different pipelines.

Application(s) 520 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method for maintaining streaming parity of data events in a pipeline, the method comprising:

temporally grouping data events generated by a first application in the pipeline by adding a group identification tag to data events generated within a predetermined time window;

uploading a first set of data points identifying temporally grouped data events to a storage, wherein uploading the first set of data points comprises:

uploading, to a database, the first set of composite keys; and uploading, to the cache and for each data point, an event identification tag that uniquely identifies a data event corresponding to the data point;

for the first set of data points, uploading to a cache, a first set of composite keys, each comprising the group identification tag and a first identification tag of the first application;

retrieving temporally grouped data events received by a second application from the first application;

uploading to the storage a second set of data points identifying temporally grouped data events received by the second application from the first application, wherein uploading the second set of data points comprises:

uploading, to the database, a second set of composite keys; and uploading, to the cache and for each data point, an event identification tag that uniquely identifies a data event corresponding to the data point;

for the second set of data points, uploading to the cache, a second set of composite keys, each comprising the group identification tag and a second identification tag of the second application;

aggregating the first set of data points based on the first identification tag and the group identification tag by:

removing duplicate event identification tags associated with the first set of composite keys;

organizing remaining event identification tags according to the first set of composite keys;

removing duplicate composite keys from the first set of composite keys; and counting a number of remaining composite keys in the first set of composite keys after the duplicate composite keys are removed;

aggregating the second set of data points based on the second identification tag and the group identification tag by:

removing duplicate event identification tags associated with the second set of composite keys;

organizing remaining event identification tags according to the second set of composite keys;

removing duplicate composite keys from the second set of composite keys, and counting a number of remaining composite keys in the second set of composite keys after the duplicate composite keys are removed;

determining that the streaming parity of the temporally grouped data events is not maintained by determining that the aggregated first set of data points does not match the aggregated second set of data points;

identifying a data event generated by the first application but not received by the second application based on comparing the first set of composite keys and the second set of composite keys; and performing a remedial action to maintain the streaming parity.

2. The computer-implemented method of claim 1, wherein determining that the aggregated first set of data points does not match the aggregated second set of data points comprises:

determining that the number of remaining composite keys in the first set of composite keys does not match the number of remaining composite keys in the second set of composite keys.

3. The computer-implemented method of claim 1, wherein determining that the aggregated first set of data points does not match the aggregated second set of data points comprises:

determining that the remaining event identification tags organized according to the first set of composite keys do not match the remaining event identification tags organized according to the second set of composite keys.

4. The computer-implemented method of claim 1, further comprising:

determining that the streaming parity of the temporally grouped data events is not maintained by determining that the remaining event identification tags organized according to the first set of composite keys do not match the remaining event identification tags organized according to the second set of composite keys; and outputting unmatched event identification tags associated with corresponding composite keys in the second set of composite keys.

5. The computer-implemented method of claim 1, wherein aggregating the second set of data points based on the second identification tag and the group identification tag comprises:

removing the remaining event identification tags organized according to the first set of composite keys as matching event identification tags associated with the second set of composite keys are uploaded to the cache.

6. The computer-implemented method of claim 5, wherein determining that the aggregated first set of data points does not match the aggregated second set of data points comprises:

determining that there is at least one unmatched event identification tags in the cache.

7. The computer-implemented method of claim 5, further comprising:

determining that the streaming parity of the temporally grouped data events is not maintained by determining that there is at least one unmatched event identification tag in the cache; and outputting the at least one unmatched event identification tag associated with a corresponding composite key in the first set of composite keys.

8. A system comprising:

a non-transitory storage medium storing computer program instructions; and a processor configured to store the computer program instructions to cause operations comprising:

temporally grouping data events generated by a first application in a pipeline by adding a group identification tag to data events generated within a predetermined time window;

uploading to a storage a first set of data points identifying temporally grouped data events to a storage, wherein uploading the first set of data points comprises:

uploading, to a database, the first set of composite keys; and uploading, to the cache and for each data point, an event identification tag that uniquely identifies a data event corresponding to the data point;

for the first set of data points, uploading to a cache, a first set of composite keys, each comprising the group identification tag and a first identification tag of the first application;

retrieving temporally grouped data events received by a second application from the first application;

uploading to the storage a second set of data points identifying temporally grouped data events received by the second application from the first application, wherein uploading the second set of data points comprises:

uploading, to the database, a second set of composite keys; and uploading, to the cache and for each data point, an event identification tag that uniquely identifies a data event corresponding to the data point;

for the second set of data points, uploading to the cache, a second set of composite keys, each comprising the group identification tag and a second identification tag of the second application;

aggregating the first set of data points based on the first identification tag and the group identification tag by:

removing duplicate event identification tags associated with the first set of composite keys;

organizing remaining event identification tags according to the first set of composite keys;

removing duplicate composite keys from the first set of composite keys; and counting a number of remaining composite keys in the first set of composite keys after the duplicate composite keys are removed;

aggregating the second set of data points based on the second identification tag and the group identification tag by:

removing duplicate event identification tags associated with the second set of composite keys;

organizing remaining event identification tags according to the second set of composite keys;

removing duplicate composite keys from the second set of composite keys, and counting a number of remaining composite keys in the second set of composite keys after the duplicate composite keys are removed;

determining that a streaming parity of the temporally grouped data events is not maintained by determining that the aggregated first set of data points does not match the aggregated second set of data points;

identifying a data event generated by the first application but not received by the second application based on comparing the first set of composite keys and the second set of composite keys; and performing a remedial action to maintain the streaming parity.

9. The system of claim 8, wherein determining that the aggregated first set of data points does not match the aggregated second set of data points comprises:

determining that the number of remaining composite keys in the first set of composite keys does not match the number of remaining composite keys in the second set of composite keys.

10. The system of claim 8, wherein determining that the aggregated first set of data points does not match the aggregated second set of data points comprises:

determining that the remaining event identification tags organized according to the first set of composite keys do not match the remaining event identification tags organized according to the second set of composite keys.

\* \* \* \* \*